Oct. 30, 1934.  G. KALSCHNE  1,979,111

METAL HEATING

Filed Oct. 10, 1932

Inventor:
Georg Kalschne,
by Charles E. Sullar
His Attorney.

Patented Oct. 30, 1934

1,979,111

UNITED STATES PATENT OFFICE 1,979,111

METAL HEATING

Georg Kalschne, Berlin, Germany, assignor to General Electric Company, a corporation of New York Application October 10, 1932, Serial No. 637,118
In Germany October 12, 1931

5 Claims. (Cl. 219—11)

My invention relates to metal heating by electricity and more particularly to the heating of tools having cutting edges which due to their resistance or their restricted area are more rapidly heated by the passage of electric current therethrough than is the body of the tool of which they form a part.

Cutting tools are often formed by welding together metals of dissimilar qualities such as tips of high speed or high carbon steel to shanks of tool steel. Tools thus formed, after an annealing operation, may be forged and worked as if the entire tool were formed of a homogeneous material. Due to the different characteristics of the tip portion, however, and due to the configuration imparted thereto during the forging operation, it is difficult to re-heat such tools electrically for a subsequent forging operation by means of which the cutting edges are re-shaped after having become worn or broken.

It is an object of my invention to provide means for electrically heating the cutting end portions of tools without burning them or destroying the characteristics of the metal of which they are formed.

It is a further object of my invention to provide a method of procedure by means of which the end portion of the tool is uniformly heated in order to render it suitable for reforging and hardening.

Figure 1:
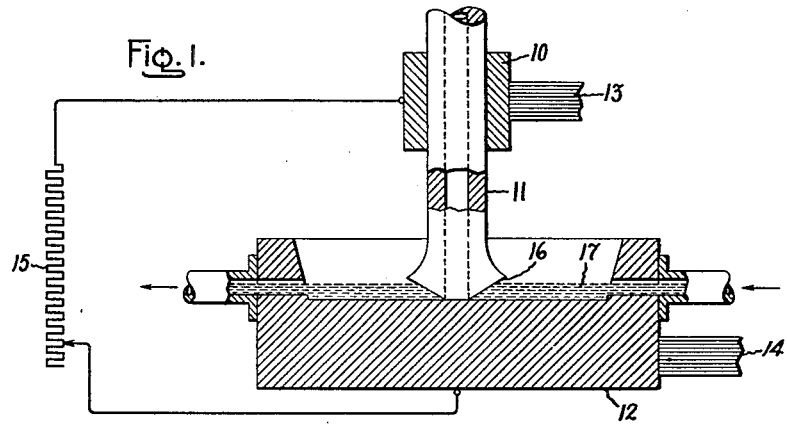
Figure 2:
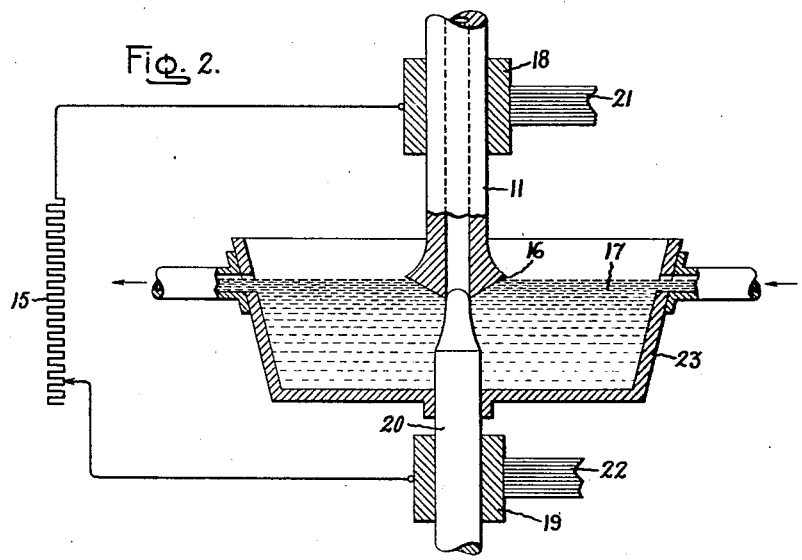
Figure 3:
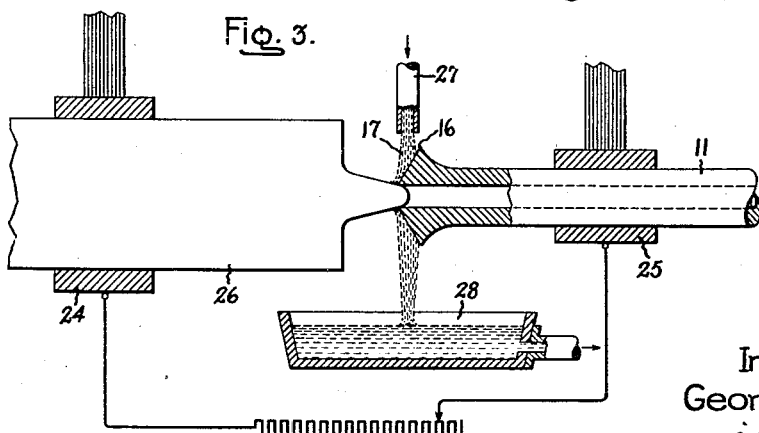

Further objects of my invention will become apparent from a consideration of the following description of the several embodiments thereof diagrammatically illustrated in the accompanying drawing, Fig. 1 of which shows apparatus particularly adapted for performing my method of heating, and Figs. 2 and 3 of which show spot and butt welding machines which have been modified for this purpose.

The machine illustrated in Fig. 1 comprises an electrode 10 by means of which the tool to be heated, 11, is clamped and held in abutting engagement with the surface of a cooperating electrode 12. Each of the electrodes 10 and 11 are connected through conductors 13 and 14 to the secondary of a transformer by means of which heating current is applied thereto. The amount of current flowing through the tool may be controlled by adjusting the transformation ratio of the transformer or by adjusting a controlling resistance such as the resistance 15 connected across the electrodes 10 and 12. The tool illustrated in the drawing is a hollow drill the cutting edges 16 of which are located at the end thereof making engagement with the surface of electrode 12. In order to cool these cutting edges and prevent their destruction due to the flow of heating current through the end of the drill a cooling medium 17 is circulated over the surface of electrode 12 and the end portion on the drill held in engagement therewith. This cooling medium may be water, oil, or a similar material. I have found that a weak solution of soap in water is particularly suited for this cooling operation.

The method of operation by means of which the end portion of the tool is uniformly heated for reforging and hardening is as follows: The tool is supported in the machine as illustrated in Fig. 1 and sufficient current passed therethrough to heat the body portion of the tool to a temperature slightly greater than that desired. The tool is then removed from the machine and the heat stored in the body of the tool is permitted to distribute itself uniformly through the end of the tool. The tool is then in condition for reforging or hardening, or both.

The apparatus illustrated in Fig. 2 is a spot welding machine having electrode clamps 18 and 19. The lower clamp 19 is provided with a pointed electrode 20 on which is supported a hollow drill rod 11 held by the upper clamp 18. Current is supplied to the drill rod from the secondary of a transformer the terminal portions 21 and 22 of which are connected to the clamps 18 and 1". The amount of current supplied to the tool may be determined by an adjustment of the transformer ratio or an adjustable controlling resistance such as the resistance 15 connected to the clamps 18 and 19. The tip of the electrode 20 is supported in a trough or receptacle 23 to which a cooling medium 17 is supplied. The arrangement is such that the cutting edges 16 of the tool are immersed in the cooling medium. Thus, during the application of heating current to the tool the edge portions thereof are maintained sufficiently cool to prevent their destruction.

It is obvious that the method of heating described above may also be performed with the apparatus illustrated in Fig. 2.

My method of heating may also be performed on a butt welding machine and the arrangement of parts for accomplishing this result is illustrated in Fig. 3. In this figure the work clamps are shown at 24 and 25. A pointed electrode 26 is supported in clamp 24 and the tool 11 is supported in clamp 25. Current is supplied through the tool as in the arrangements above described. During the heating operation the cutting edges 16 of the tool are maintained sufficiently cool to prevent their destruction by applying a cooling medium thereto. In this case the cooling medium is supplied as a stream or spray through a pipe 27 and the medium thus supplied is collected in a receptacle 28 placed immediately below the pipe.

It is obvious that the apparatus above described for performing my improved heating operation may be variously modified without departing from my invention, and although the method of operation has been described as applied to hollow drill rods, it is to be understood that my invention is not limited thereto but may be equally applied to other work parts having end portions of reduced cross-section or of high resistance material.

What I claim as new and desire to secure by Letters Patent of the United States is:

1. The method of heating a work part which comprises heating the body portion of said work part adjacent an end portion thereof by supplying electric current thereto through said end portion while cooling said end portion by the application of a cooling medium thereto and thereafter interrupting said heating and cooling operations and permitting the heat stored in the body of the work part to extend to said end portion.

2. Heating apparatus comprising means for placing the end of a work part to be heated against an electrode, means for supplying current to said work part through said electrode, and means for circulating a cooling medium over the end of said work part and the surface of the electrode against which it is held.

3. Heating apparatus comprising an electrode adapted to make a surface engagement with the end portion of a work part to be heated, means for holding said work part in engagement therewith, means for supplying electric current to said work part through said electrode, and means for circulating a cooling medium over the surface of said electrode and the end portion of the work part held in engagement therewith.

4. Heating apparatus comprising an electrode of extended surface area, means for holding the cutting edge of a tool in engagement with said electrode, means for supplying electric current to said tool through said electrode, and means for circulating a cooling medium over the surface of said electrode and the end portion of said tool held in engagement therewith.

5. Apparatus for heating the cutting end of a hollow drill comprising a pointed electrode, means for supporting the cutting end of said drill on said pointed electrode with the tip portion thereof inserted in the hole in said drill, means for supplying electric current to said drill through said electrode, and means for circulating a cooling medium over the cutting edges of said drill.

GEORG KALSCHNE.